US008799257B1

(12) United States Patent
Hubinette

(10) Patent No.: US 8,799,257 B1
(45) Date of Patent: Aug. 5, 2014

(54) SEARCHING BASED ON AUDIO AND/OR VISUAL FEATURES OF DOCUMENTS

(75) Inventor: Carl Fredrik Hubinette, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/423,702

(22) Filed: Mar. 19, 2012

(51) Int. Cl.
*G06F 17/30* (2006.01)

(52) U.S. Cl.
USPC .................................. 707/706; 707/705

(58) Field of Classification Search
USPC .................................. 707/705, 706
See application file for complete search history.

(56) References Cited

U.S. PATENT DOCUMENTS

| | | | |
|---|---|---|---|
| 2004/0205076 A1* | 10/2004 | Huang et al. | 707/100 |
| 2007/0067305 A1* | 3/2007 | Ives | 707/10 |
| 2007/0127823 A1* | 6/2007 | Seeber | 382/218 |
| 2007/0174332 A1* | 7/2007 | Stephens | 707/102 |
| 2008/0046240 A1* | 2/2008 | Gorodyansky et al. | 704/235 |
| 2008/0154889 A1* | 6/2008 | Pfeiffer | 707/5 |
| 2009/0307219 A1* | 12/2009 | Bennett | 707/6 |
| 2010/0036818 A1* | 2/2010 | Valencia-Campo et al. | 707/3 |
| 2010/0281034 A1* | 11/2010 | Petrou et al. | 707/748 |
| 2011/0022591 A1* | 1/2011 | Stiffelman et al. | 707/728 |
| 2011/0026814 A1* | 2/2011 | Nuuja et al. | 382/164 |
| 2011/0225178 A1* | 9/2011 | Ingrassia et al. | 707/769 |
| 2012/0109858 A1* | 5/2012 | Makadia et al. | 706/12 |
| 2012/0209793 A1* | 8/2012 | Morris | 706/11 |
| 2012/0330922 A1* | 12/2012 | Kong et al. | 707/709 |

OTHER PUBLICATIONS

Book entitled "Information Trapping: Real-Time Research on the Web", by Calishain, published on Dec. 7, 2006.*
Coversheet for Book entitled "Information Trapping: Real-Time Research on the Web", by Calishain, published on Dec. 7, 2006.*
Article entitled "LeeDeo: Web-Crawled Academic Video Search Engine" by Lee et al., Copyright 2008.*
Article entitled "Google Video Advanced Video Search" by Google, dated Dec. 14, 2007.*

* cited by examiner

*Primary Examiner* — Mahesh Dwivedi
(74) *Attorney, Agent, or Firm* — Harrity & Harrity, LLP

(57) ABSTRACT

One or more computer devices may generate a keyword based on a visual feature or an audible feature of a document. The visual feature may include a color of a background of the document, a color of text in the document, a size of the text in the document, or a feature relating to a video in the document. The audible feature may relate to sound or music that is associated with the document. The one or more computer devices may further associate, in an index, the keyword with information identifying the document, receive a search query from a client, the search query including a term related to the keyword, identify documents based on the search query and using the index, the identified documents including the document, and provide a search results document to the client. The search results document may identify one or more of the identified documents.

20 Claims, 13 Drawing Sheets

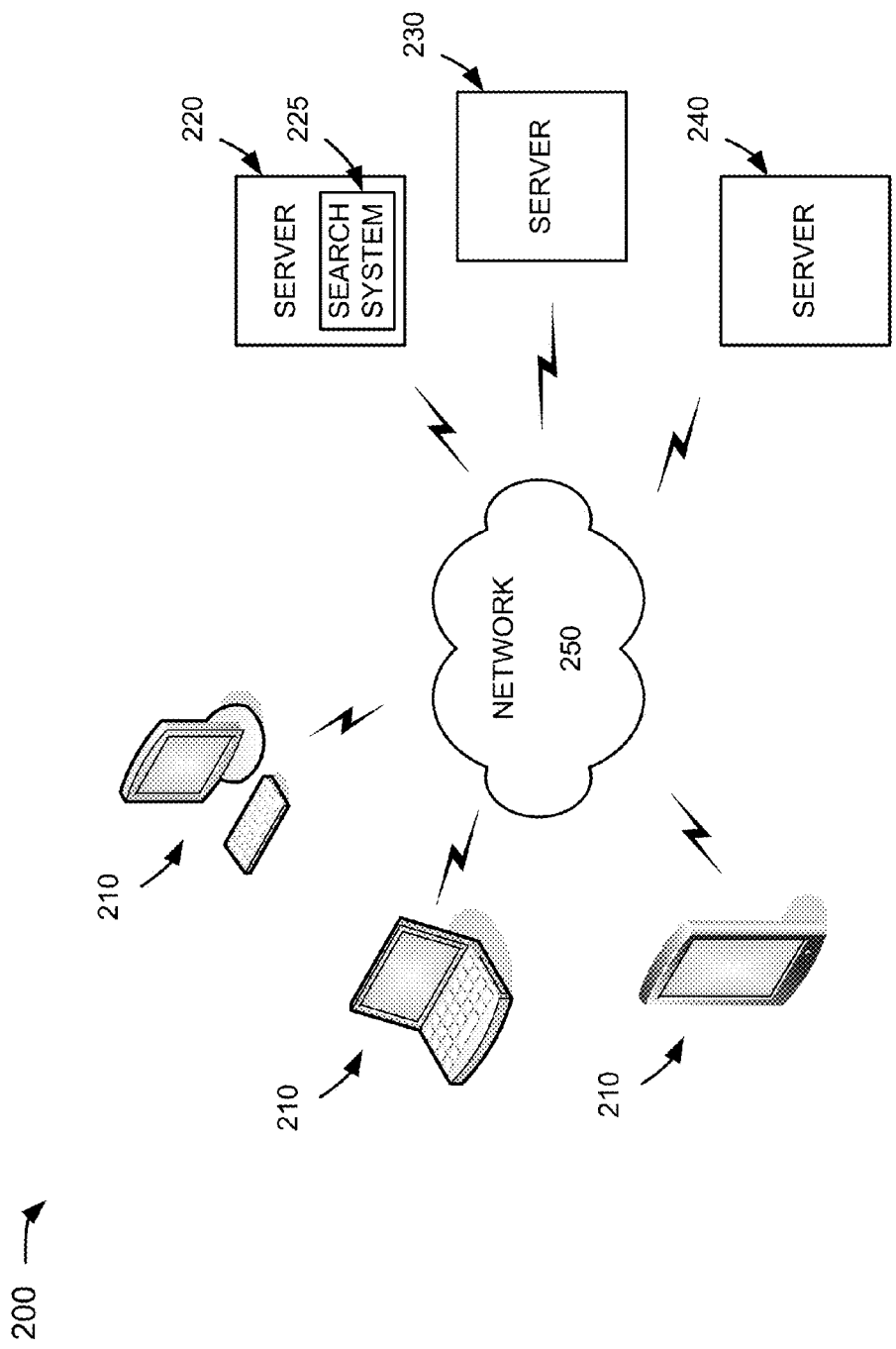

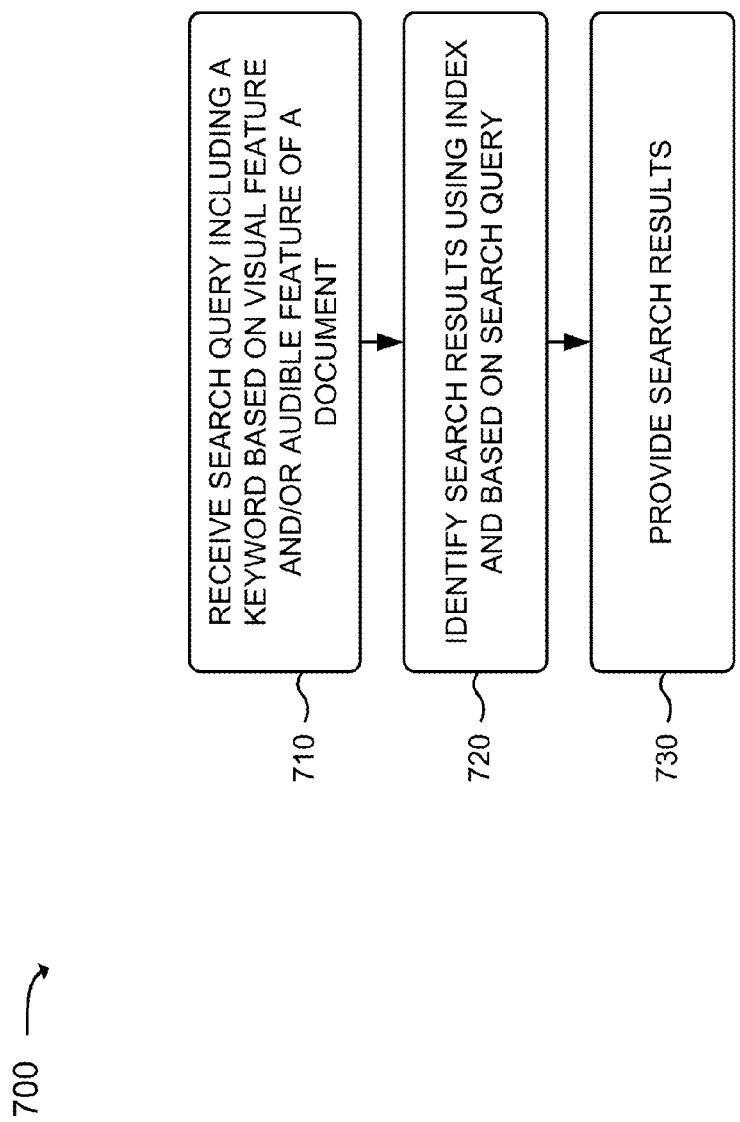

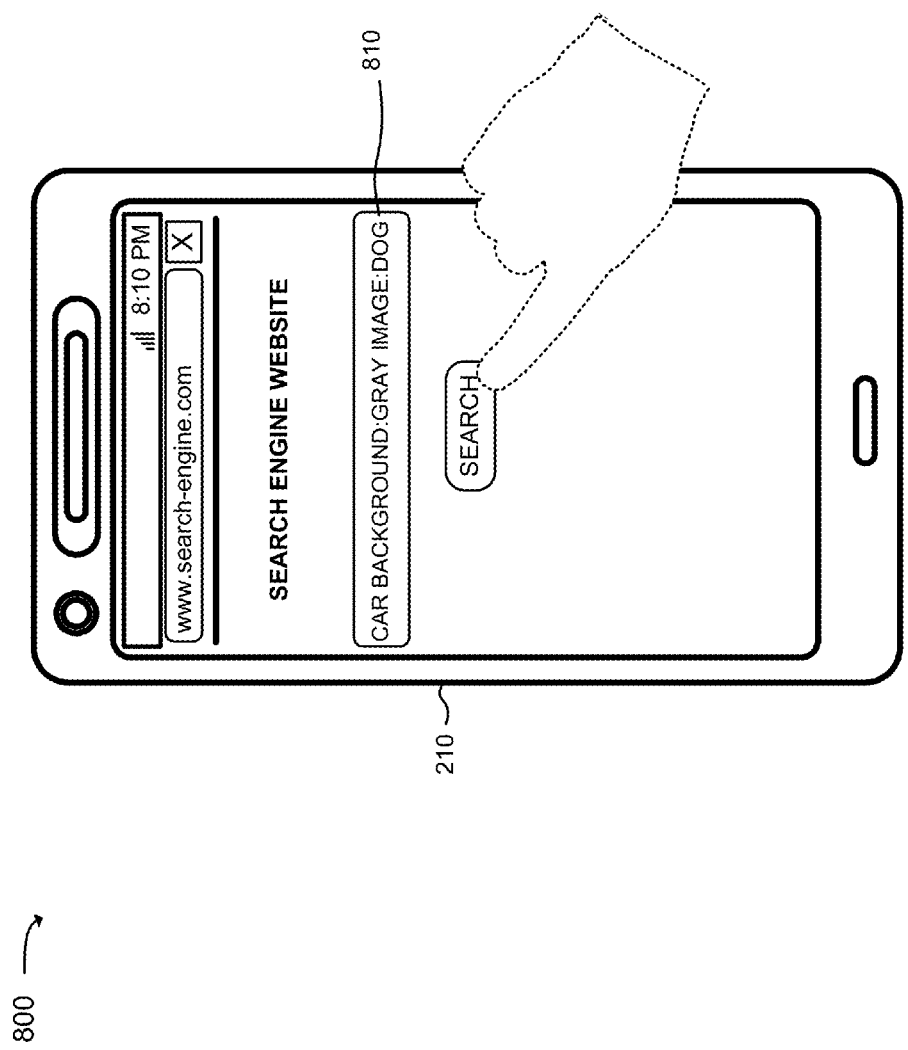

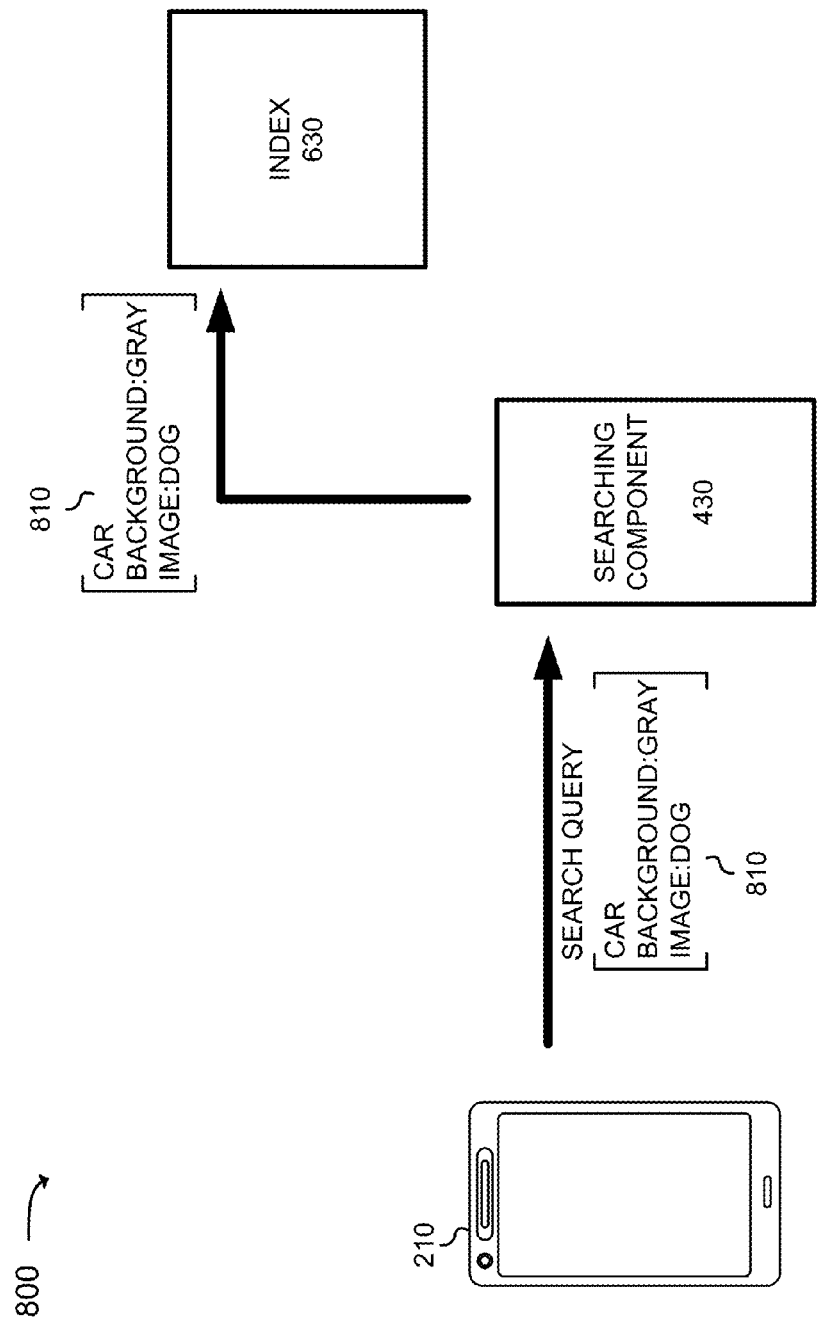

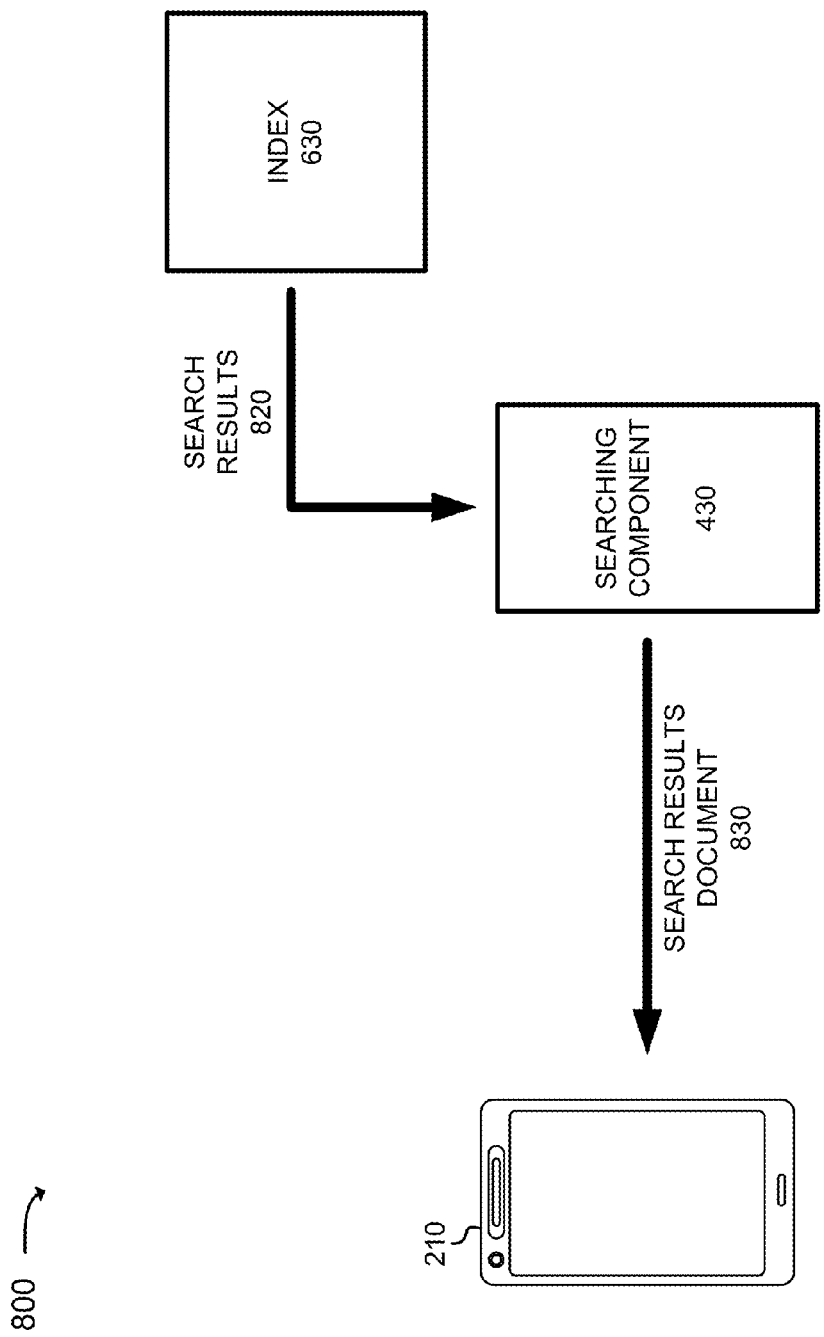

SEARCHING BASED ON AUDIO AND/OR VISUAL FEATURES OF DOCUMENTS

BACKGROUND

Many techniques are available to a user today to find information on the World Wide Web, also referred to as the "web." For example, web browsers and/or search engines may be used to find information of interest. Revisiting web pages of interest when the user has forgotten the addresses of those web pages may require the user to search, possibly for a lengthy period of time, for those web pages.

SUMMARY

According to some implementations, a method may include generating, by one or more computer devices, a keyword based on a visual feature of a document or an audible feature of the document. The visual feature may include a color of a background of the document, a color of text in the document, a size of the text in the document, or a feature relating to a video in the document. The audible relates to sound or music that is associated with the document. The method may further include associating, by the one or more computer devices and in an index, the keyword with information identifying the document; receiving, by the one or more computer devices, a search query from a client, the search query including a term related to the keyword; identifying, by the one or more computer devices, documents based on the search query and using the index, the identified documents including the document; and providing, by the one or more computer devices, a search results document to the client, the search results document identifying one or more of the identified documents.

Systems and/or methods, as described herein, can greatly enhance the flexibility of a search system in providing search results. Not only can the search system provide search results based on the text included in documents, but also, or alternatively, based on audio and/or visual features associated with the documents. Moreover, systems and/or methods, as described herein, may decrease the amount of resources, of the search system, needed for a user to locate a desired document, for example, in those situations where the user has previously viewed a document and remembers one or more visual or audible features of the document, but cannot recall the exact text included in the document.

BRIEF DESCRIPTION OF THE DRAWINGS

The accompanying drawings, which are incorporated in and constitute a part of this specification, illustrate some implementations described herein and, together with the description, explain these implementations. In the drawings:

FIG. 2 is a diagram of an example environment in which systems and/or methods described herein may be implemented;

FIG. 7 is a flowchart of an example process for providing search results; and

FIGS. 8A-8E are diagrams of an example of the process of FIG. 7.

DETAILED DESCRIPTION

The following detailed description refers to the accompanying drawings. The same reference numbers in different drawings may identify the same or similar elements.

A system and/or method, as described herein, may allow users to perform a search based on the appearance of documents, when the documents are rendered for display, or audio produced when the documents are rendered for display. For example, a system and/or a method, as described herein, may index audio features, e.g., sound or music, and/or visual features, e.g., background color of a group of documents. In this way, a user may search the group of documents based on terms in the documents, audio features of the documents, and/or visual features of the documents.

The term document, as used herein, is to be broadly interpreted to include any machine-readable and machine-storable work product. A document may include, for example, a website, an e-mail, a business listing, a file, a combination of files, one or more files with embedded links to other files, a news group posting, a blog, etc. In the context of the Internet, a common document is a web page. Documents often include textual information and may include embedded information, such as meta information, images, hyperlinks, etc., and/or embedded instructions, such as Javascript, etc.

Figure 1A:
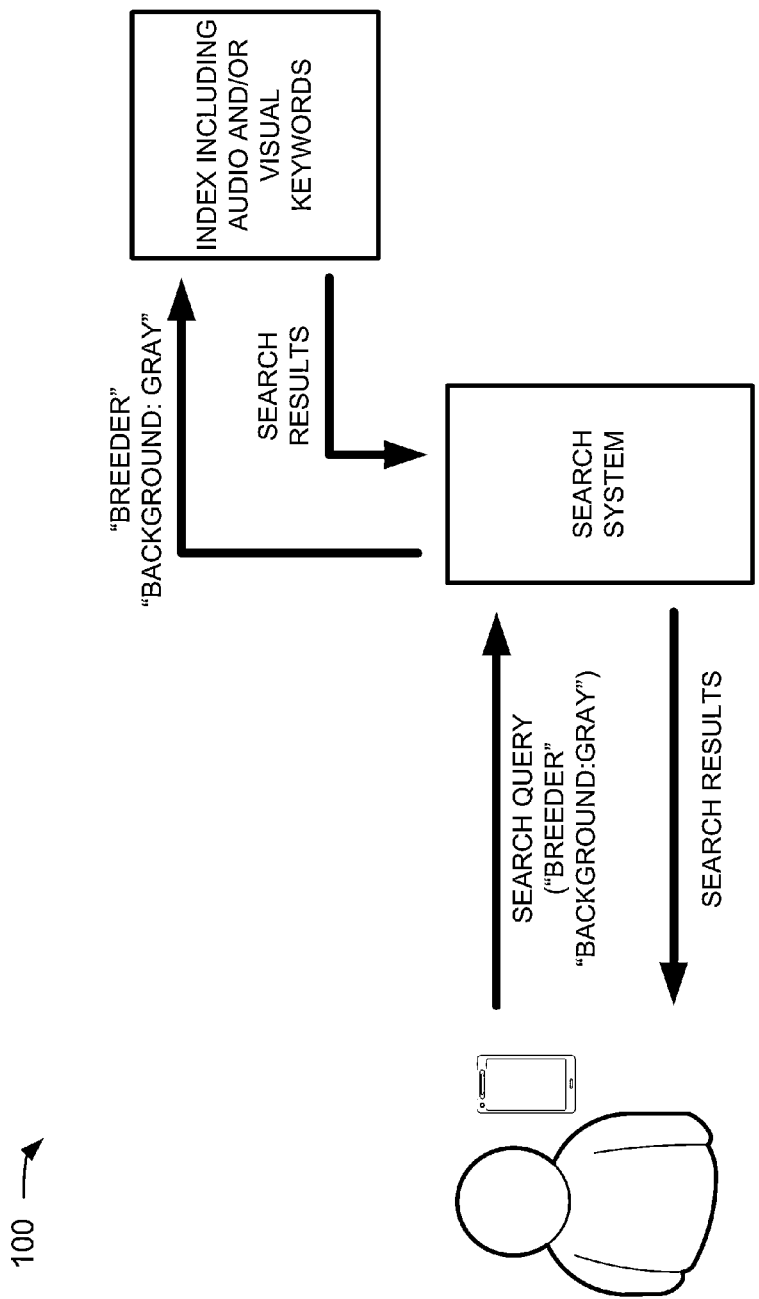
FIGS. 1A and 1B are diagrams illustrating an overview of some implementations described herein.
Figure 1B:

FIGS. 1A and 1B are diagrams illustrating an overview of some implementations described herein. Assume, for example 100, that a user is interested in buying a dog and performed a search for the term "breeder." Assume further that the user's search involved the review of hundreds of search results. In addition, assume that, after weeks of contemplating the purchase, the user made the decision to purchase a particular dog, but cannot remember which breeder had the particular dog. The user can remember, however, details regarding the appearance of the breeder's web page. For example, assume that the user remembered that the breeder's web page had a gray background. Thus, as shown in FIG. 1A, the user may submit, to a search system, a search query that includes a textual search component, e.g., "breeder," to search for web pages that include the term "breeder" and a visual search component, e.g., "background:gray," to search for web pages that include a gray background. The search system may use an index, which includes words from the web pages and words reflecting audio and/or visual features of the web pages, to identify a set of web pages relating to the search query. The search system may provide a document, including a ranked list of links to the identified set of web pages, to the user. In this way, the user may quickly identify the breeder's web page, shown in FIG. 1B, without having to possibly re-review hundreds of search results.

FIG. 2 is a diagram of an example environment 200 in which systems and/or methods described herein may be implemented. Environment 200 may include multiple clients 210 connected to multiple servers 220-240 via a network 250.

Each of clients 210 may include a client device, such as personal computer, a wireless telephone, a personal digital assistant, also referred to as a "PDA," a laptop, a tablet computer, or another type of computation or communication device. Clients 210 may include user interfaces presented through one or more browsers, e.g., web browsers.

Servers 220-240 may include server devices that gather, process, search, and/or implement functions in a manner described herein. Each server 220-240 may be implemented as a single server device or a collection of server devices that may be co-located or remotely located. Additionally, or alternatively, any two or more of servers 220-240 may be implemented within a single, common server device or a single, common collection of server devices. While servers 220-240 are shown as separate components, it may be possible for one or more of servers 220-240 to perform one or more of the functions of another one or more of servers 220-240.

As shown in FIG. 2, server 220 may implement a search system 225 that receives search queries from clients 210, and that provides search results that are responsive to the search queries. Server 220 may crawl a corpus of documents, e.g., web pages, index the documents, and store information associated with the documents. Servers 230 and 240 may store or maintain documents that may be crawled or analyzed by server 220.

Network 250 may include any type of network, such as, for example, a local area network, also referred to as a "LAN," a wide area network, also referred to as a "WAN," a telephone network, such as the Public Switched Telephone Network or a cellular network, an intranet, the Internet, a combination of networks, etc. Clients 210 and servers 220-240 may connect to network 250 via wired and/or wireless connections. In other words, any one of clients 210 and servers 220-240 may connect to network 250 via a wired connection, a wireless connection, or a combination of a wired connection and a wireless connection.

Although FIG. 2 shows example components of environment 200, in some implementations, environment 200 may include additional devices and/or networks, fewer devices and/or networks, different devices and/or networks, and/or differently arranged devices and/or networks than those depicted in FIG. 2. Additionally, or alternatively, one or more components of environment 200 may perform one or more tasks described as being performed by one or more other components of environment 200.

Figure 3:
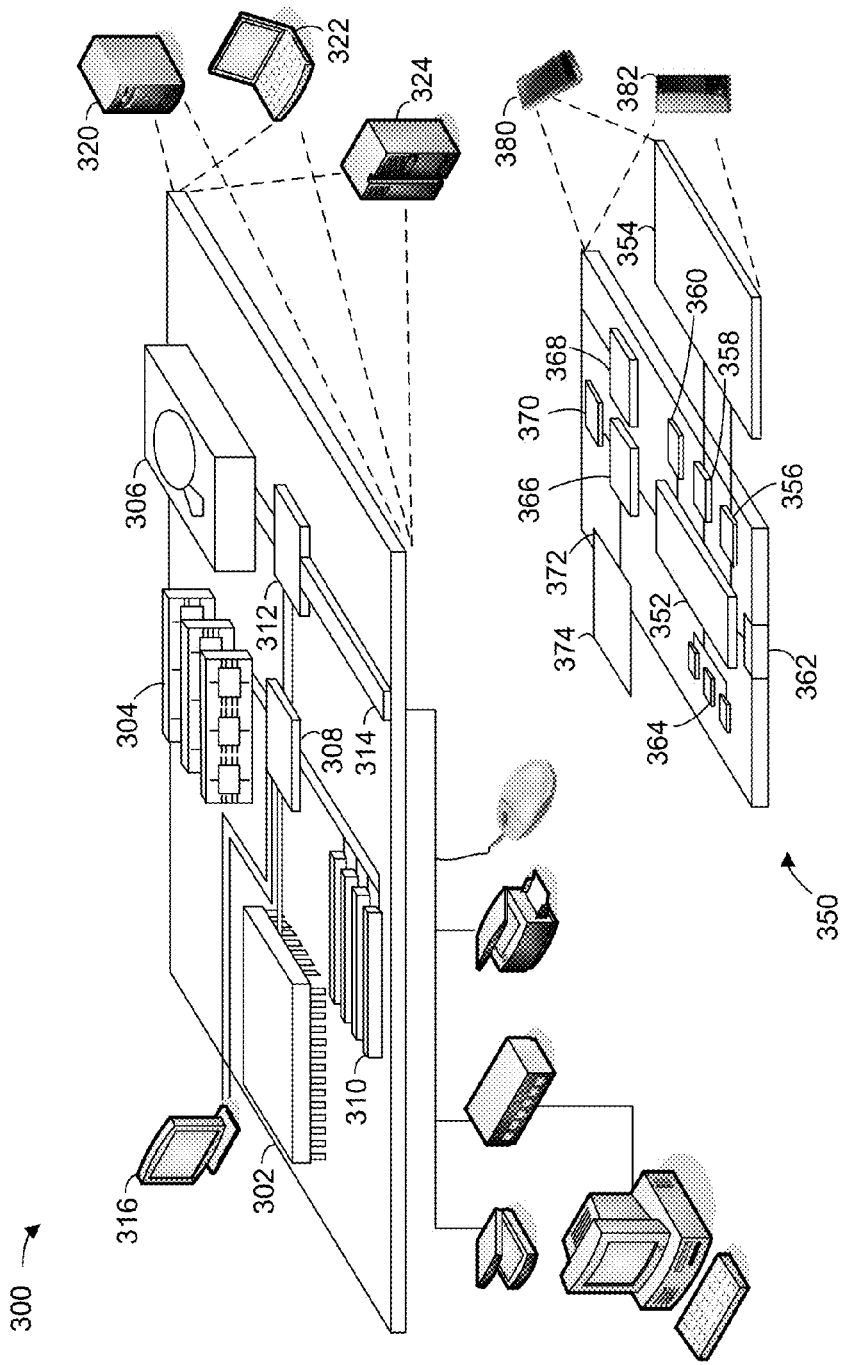
FIG. 3 shows an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface, also referred to as a "GUI," on an external input/output device, such as display 316 coupled to high-speed interface 308. In some implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In some implementations, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is provided for explanatory purposes only. In some implementations, high-speed interface 308 may be coupled to memory 304, display 316, e.g., through a graphics processor or accelerator, and to high-speed expansion ports 310, which may accept various expansion cards. In some implementations, low-speed interface 312 may be coupled to storage device 306 and low-speed expansion port 314. Low-speed expansion port 314, which may include various communication ports, e.g., USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display or an Organic Light Emitting Diode display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication in some implementations, or for wireless communication in some implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module, also referred to as "SIMM," card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer-or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, a Global Positioning System, also referred to as "GPS," receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed application specific integrated circuits, computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices, used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube or liquid crystal display monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback. Also, input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
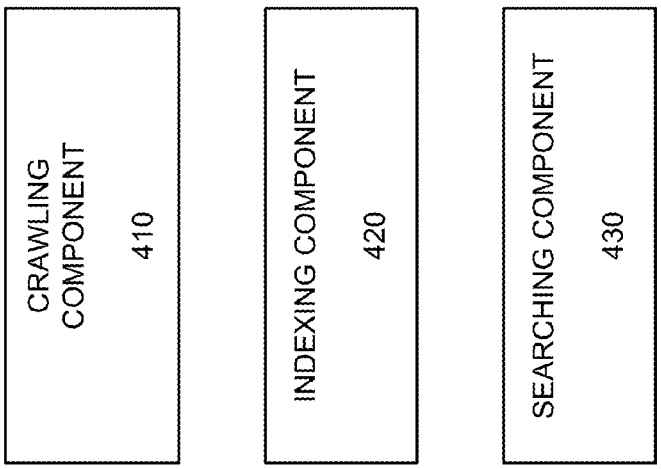
FIG. 4 is a diagram of example functional components of a search system of FIG. 2.

FIG. 4 is a diagram of example functional components of search system 225. Each of the functional blocks, shown in FIG. 4, may be implemented by one or more of the components described with regard to FIG. 3. As shown in FIG. 4, search system 225 may include a crawling component 410, an indexing component 420, and a searching component 430.

Crawling component 410 may receive feeds of documents from one or more webmasters. Additionally, or alternatively, crawling component 410 may operate from a list of addresses to fetch the corresponding documents from a corpus of documents, e.g., from the Internet. Crawling component 410 may extract the addresses, e.g., URLs, associated with outgoing links in the documents and add the addresses to the list of addresses to be crawled. Crawling component 410 may also store information associated with the documents, such as all or part of the documents, in a memory.

Indexing component 420 may process documents identified by crawling component 410. For example, indexing component 420 may extract information from an identified document and associate, in an index, keywords, based on the extracted information, with information identifying the document. The extracted information may include text or hypertext markup language, also referred to as "HTML," code included in the document and/or other information that is located external to the document. For example, indexing component 420 may extract text and HTML code from a crawled document, extract individual terms and/or other data from the text and HTML code, and store those terms and/or other data, as keywords, in an index. Indexing component 420 may also obtain other information related to the crawled document and determine keywords based on the other information.

In one example, indexing component 420 may obtain and index keywords relating to audio features and/or visual features of the crawled documents. The audio features may include a feature relating to sound and/or music associated with a document. For example, the audio features may include an indication of whether or not the document includes sound when the document is rendered for display, an indication of whether or not the document includes music when the document is rendered for display, an indication, when the document includes a sound, of the type of the sound associated with the document, e.g., spoken word, beeping sound, etc., and/or an indication, when the document includes music, of the name of the music, the style of the music, e.g., rock music, classical music, etc., a name of an artist associated with the music, etc.

The visual features may include a feature relating to the visual appearance of a document when the document is rendered for display. For example, the visual features may include a feature relating to the color of the background of a document when the document is rendered for display, a feature relating to the color of the text in the document when the document is rendered for display, a feature relating to the size of the text in the document when the document is rendered for display, a feature relating to a length of the document when the document is rendered for display, a feature relating to a style of the document, e.g., Cascading Style Sheets information, a user-perceived style of the document, etc., when the document is rendered for display, a feature relating to an image in the document, e.g., a content of the image, a quantity of images in the document, a geographic location associated with the image, a date and/or time when the image was captured, etc., when the document is rendered for display, a feature relating to a video in the document, e.g., an indication of whether or not the document includes a video, the name of the video, etc., when the document is rendered for display, and/or other types of visual features.

Indexing component 420 may use word-level indexing to extract information from the documents and index the extracted information. Indexing component 420 may also use other techniques for indexing information relating to the documents. For example, indexing component 420 may use techniques for indexing extensible markup language data, images, audio information, video information, etc.

Each entry in the index may include a term or other data stored in association with a list of documents in which the term or other data appears and the location within the document where the term or other data appears. In some implementations, each entry in the index may identify a document, a list of terms that appear within the document, and/or other information, e.g., metadata, associated with the document. For example, assume a document, identified by crawling component 410, includes a gray background, black text, an image of a car, and an image of a building. In this example, indexing component 420 may associate, with information identifying the document and in the index, information identifying the background as gray, information identifying the text as black, information identifying the quantity of images, and information identifying that the images include a car and a building. Thus, a user may then search for the document based on the color of the background of the document, the color of the text of the document, a quantity of images in the document, and/or the content of the images in the document.

Searching component 430 may receive a search query and perform a search using the index and based on the search query. For example, searching component 430 may compare the terms of the search query to terms in the index to obtain a list of search results. Additionally, or alternatively, searching component 430 may receive search results, relevant to the search query, from one or more other search systems.

A search query may include terms, referred to as audio/visual terms, that identify that a user is interested in searching for audio features and/or visual features of documents. The audio/visual terms may be structured in a way so as to allow searching component 430 to determine that the user intends to perform the search for audio features and/or visual features. In one example, the terms may have the following structure: "feature:search term," where "feature" may refer to an audio or visual feature and "search term" may refer to a term that is to be searched in relation to the audio or visual feature. As an example, if a user is interested in searching for documents that include an image of a dog, the user may include the audio/visual term "image:dog" in the search query. As a second example, if the user is interested in searching for documents that include a black background, white text, and includes music, the user may include the audio/visual terms "background:black," "text:white," and "music:present" in the search query. Other ways of structuring audio/visual terms may alternatively be used.

Search component 420 may generate scores for the search results. In some implementations, the score, for a search result, may reflect a measure of relevance of the corresponding document to the search query. For example, the score may reflect the measure of relevance of the corresponding document to the one or more search terms in the search query.

In some implementations, the score, for a search result, may reflect a measure of quality of the corresponding document. In these implementations, the search query may be used to identify a relevant document, which is scored based on the document's measure of quality. Several techniques exist for measuring the quality of a document, such as a technique based on the source of the document, a technique based on an age of the document, a technique based on user accesses of the document, and/or other techniques.

In some implementations, the score, for a search result, may reflect a combination of a measure of relevance of the corresponding document to a search query and a measure of quality of the corresponding document. In some implementations, the score, for a search result, may reflect a weighted combination of a measure of relevance of the corresponding document to a search query and a measure of quality of the corresponding document, where the measure of relevance may be weighted differently from the measure of quality. In some implementations, the score, for a search result, may be determined in another manner.

Searching component 430 may rank the search results based on the scores. For example, searching component 430 may create a list of search results and sort the search results, in the list, based on the scores of the search results. In some implementations, searching component 430 may provide a document that includes information identifying the ranked list of search results.

Although FIG. 4 shows example functional components of search system 225, in some implementations, search system 225 may include additional functional components, different functional components, and/or fewer functional components than those depicted in FIG. 4. Additionally, or alternatively, one or more functional components of search system 225 may perform one or more tasks described as being performed by one or more other functional components of search system 225.

Figure 5:
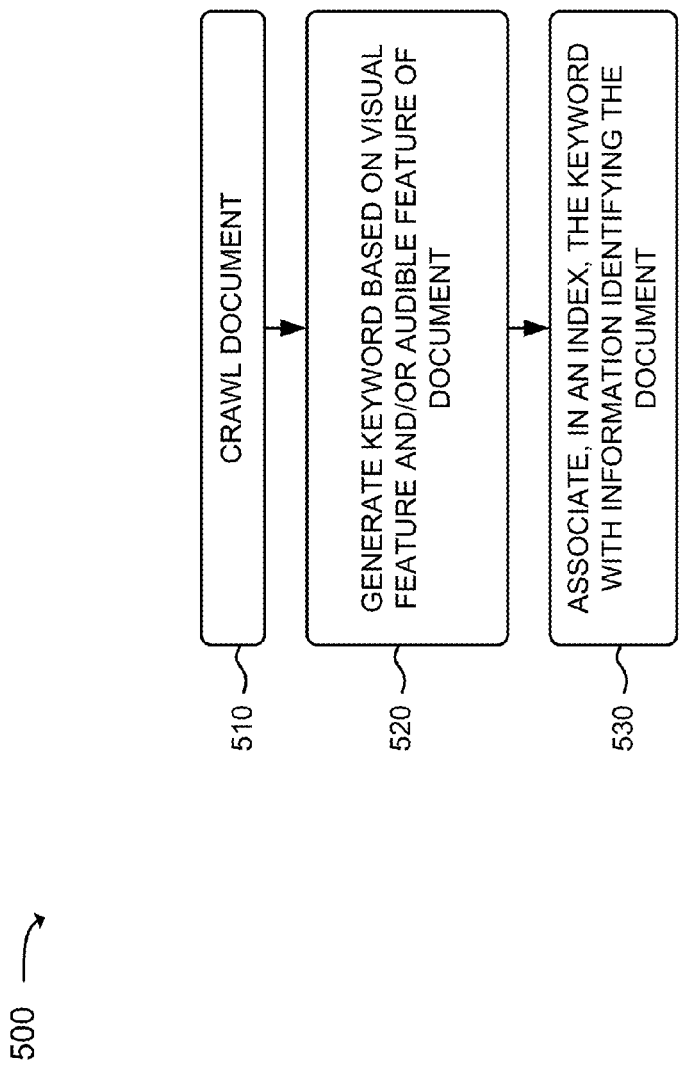
FIG. 5 is a flowchart of an example process for indexing a document.

FIG. 5 is a flowchart of an example process 500 for indexing a document. In some implementations, process 500 may be performed by server 220, such as by search system 225 of server 220. In some implementations, process 500 may be performed by one or more other devices instead of, or possibly in conjunction with, server 220. Process 500 will be described below in conjunction with example 600 shown in FIG. 6.

Figure 6:
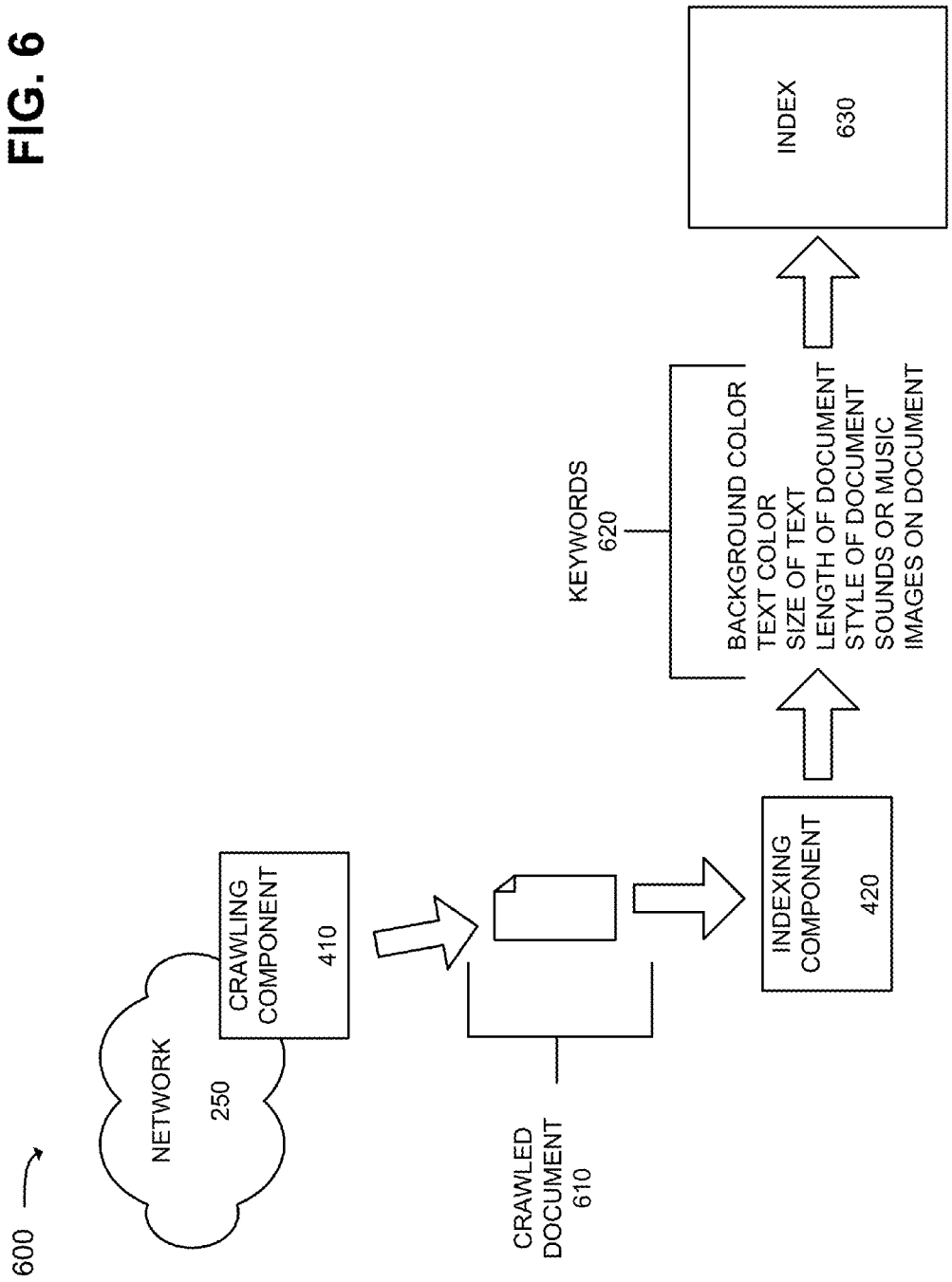
FIG. 6 is a diagram of an example of the process of FIG. 5.

Process 500 may include crawling a document, as shown in block 510. For example, server 220, e.g., crawling component 410 may crawl a document 610 in a repository of documents, as shown in FIG. 6. The crawling may include using an address of document 610 to obtain document 610, and storing all or a portion of document 610 in a memory.

Process 500 may further include creating a keyword based on the content of the document or information associated with the document, as shown in block 520. For example, server 220, e.g., indexing component 420, may extract information from the text and/or HTML code of document 610 and associate, in an index 630, the extracted information, as keywords 620, with information identifying document 610, as shown in FIG. 6. In one example, keywords 620 may relate to audio features of the document. For example, indexing component 420 may create, from the HTML code of the document, a keyword 620 indicating whether or not document 610 includes a sound and/or a keyword 620 indicating whether or not document 610 includes music. In some situations, a creator of document 610 may store, in the HTML code, a name of sound and/or music that is associated with document 610 or other information relating to the sound and/or the music. In these situations, indexing component 420 may create one or more keywords 610 based on the name and/or the other information.

Additionally, or alternatively, keywords 610 may relate to visual features of document 610. For example, indexing component 420 may create, from the HTML code of document 610, a keyword 620 corresponding to the color of the background of document 610 when document 610 is rendered for display, a keyword 620 corresponding to the color of the text in document 610 when document 610 is rendered for display, a keyword 620 corresponding to the size of the text in document 610 when document 610 is rendered for display, a keyword 620 indicating whether document 610 includes an image when document 610 is rendered for display, a keyword associated with a geographic location, e.g., global satellite coordinates, associated with an image in the document, a keyword 620 indicating a date and/or time when the image was captured, and/or a keyword 620 indicating the quantity of images in document 610 when document 610 is rendered for display. In some situations, a creator of document 610 may store, in the HTML code, other information relating to an appearance of document 610 when document 610 is rendered for display. For example, the creator of document 610 may store, in the HTML code, information indicating the content of an image, information indicating a geographic location where the image was taken, and/or information indicating a style of document 610. In these situations, indexing component 420 may create one or more keywords based on the information indicating the content of the image and/or the information indicating the style of document 610.

Additionally, or alternatively, indexing component 420 may render document 610 and create a keyword 620 based on rendering document 610. For example, indexing component 420 may create a keyword 620 representing the length of document 610 or the style, e.g., a user-perceived style, such as warm, gothic, festive, etc., of document 610 based on rendering document 610 for display. In some implementations, indexing component 420 may use a machine learning framework for determining the style of document 610. For example, a model may be created to predict the probability of a particular document being of a particular style. For example, the model may receive, as training data, documents of different styles. During a training phase, attributes of the documents of the different styles may be analyzed to form a set of rules for predicting the probability of a document being of a particular one of the styles. The attributes may include colors used in the documents, patterns that appear on the documents when the documents are rendered for display, etc. Once trained, the model may be used to predict the probability of other documents being of a particular style. Indexing component 420 may use the model to determine a style of document 610. Other techniques may be used to determine a length of document 610 or a style of document 610. For example, column width of document 610 may be used to determine a length of document 610.

In addition to creating keywords 620 from a portion of document 610 or by rendering document 610, indexing component 420 may create keywords 620, relating to audio features and/or visual features of document 610, based on information external to document 610. For example, when document 610 is determined to include sound or music, indexing component 420 may obtain an audio file corresponding to the sound or the music. Indexing component 420 may create one or more keywords 620 from analyzing the audio file. For example, if the audio file includes a name of the sound or the music and/or an artist name, indexing component 420 may generate a keyword 620 based on the sound/music name and/or the artist name. Additionally, or alternatively, indexing component 420 may play the audio file and generate one or more keywords 620 representing the content of the audio file based on playing the audio file. In some implementations, the generation of keywords 620 for an audio file may be based on a machine learning framework. Other manners of generating keywords 620 for an audio file may alternatively be used.

As another example, when document 610 is determined to include an image, indexing component 420 may obtain an image file corresponding to the image. Indexing component 420 may create one or more keywords 620 from the obtained image file. For example, if the image file includes a name of the image, indexing component 420 may generate a keyword 620 based on the name. Additionally, or alternatively, indexing component 420 may render the image, analyze features of the rendered image, and generate one or more keywords 620 representing the content of the image based on the analyzed features. In some implementations, the generation of keywords 620 for an image may be based on a machine learning framework. In some situations, the machine learning framework may simply identify what types of objects are in an image, e.g., a person, a dog, a building, etc. In some situations, the machine learning framework may identify the particular object or objects, e.g., identify the particular person in the image, e.g., using facial recognition techniques, identify the particular type of dog, identify the particular building, etc., in the image. Other manners of generating keywords 620 for an image may alternatively be used.

As yet another example, when document 610 is determined to include a video, indexing component 420 may obtain a video file corresponding to the video. Indexing component 420 may create one or more keywords 620 from the obtained video file. For example, if the video file includes a name of the video, indexing component 420 may generate a keyword 620 based on the name. Additionally, or alternatively, indexing component 420 may play the video, analyze features of the played video, and generate one or more keywords 620 based on the analyzed features. In some implementations, the generation of keywords 620 for a video may be based on a machine learning framework. Other manners of generating keywords 620 for an image may alternatively be used.

Process 500 may further include associating, in an index, the keyword with information identifying the document, as shown in block 530. For example, server 220, e.g., indexing component 420, may store keywords 620 in index 630. In so doing, indexing component 420 may associate keywords 620 with information identifying document 610 in index 630.

Although FIG. 5 shows example blocks of process 500, in some implementations, process 500 may include additional blocks, different blocks, fewer blocks, and/or differently arranged blocks than those depicted in FIG. 5. Additionally, or alternatively, one or more of the blocks of process 500 may be performed in parallel.

FIG. 7 is a flowchart of an example process 700 for providing search results. In some implementations, process 700 may be performed by server 220, such as by search system 225 of server 220. In some implementations, some or all of process 700 may be performed by one or more devices separate from, or including, server 220.

Process 700 may include receiving a search query that includes a keyword based on a visual feature and/or audible feature of a document, as shown in block 710. For example, a user, of client 210, may enter a search query into client 210 and cause client 210 to submit the search query to search system 225. The search query may include an audio/visual term that indicates that the user is interested in performing a search for an audio feature and/or a visual feature of documents. For explanatory purposes, assume that the user is interested in searching for documents that relate to car repair, include a blue background, and include white text. Thus, the user may create the following search query:

"car repair" "background:blue" "text:white."
Search system 225, e.g., searching component 430, may receive the search query from client 210.

Process 700 may further include identifying search results using the index and based on the search query, as shown in block 720. For example, search system 225, e.g., searching component 430, may compare the terms of the search query to keywords in the index to obtain a list of search results. Based on the example given above, searching component 430 may identify search results that relate to car repair, have a blue background, and/or have white text. In some implementations, searching component 430 may convert a term of a search query for comparison with keywords in index 630. For example, searching component 430 may convert an audio/visual term from a first format to a second, different format, or a group of second, different formats, and compare each second, different format to keywords in index 630. Thus, if an audio/visual term in a search query is in a format that is different than the format at which keywords, corresponding to audio/visual features, are stored in index 630, searching component 430 may convert the format of the audio/visual term in the search query to match the format at which the keywords, corresponding to audio/visual features, are stored in index 630.

Search component 420 may generate scores for the search results. In some implementations, the score, for a search result, may reflect a measure of relevance of the corresponding document to the search query. For example, the score may reflect the measure of relevance of the corresponding document to the one or more terms in the search query.

In some implementations, the score, for a search result, may reflect a measure of quality of the corresponding document. In these implementations, the search query may be used to identify a relevant document, which is scored based on the document's measure of quality. Several techniques exist for measuring the quality of a document, such as a technique based on the source of the document, a technique based on an age of the document, a technique based on user accesses of the document, and/or other techniques.

In some implementations, the score, for a search result, may reflect a combination of a measure of relevance of the corresponding document to a search query and a measure of quality of the corresponding document. In some implementations, the score, for a search result, may reflect a weighted combination of a measure of relevance of the corresponding document to a search query and a measure of quality of the corresponding document, where the measure of relevance may be weighted differently from the measure of quality. In some implementations, the score, for a search result, may be determined in another manner.

Searching component 430 may rank the search results based on the scores. For example, searching component 430 may create a list of search results and sort the search results, in the list, based on the scores of the search results.

Process 700 may also include providing the search results, as shown in block 730. For example, search system 225, e.g., searching component 430, may provide a document that includes information identifying the ranked list of search results to client 210.

Although FIG. 7 shows example blocks of process 700, in some implementations, process 700 may include additional blocks, different blocks, fewer blocks, and/or differently arranged blocks than those depicted in FIG. 7. Additionally, or alternatively, one or more of the blocks of process 700 may be performed in parallel.

Figure 8D:
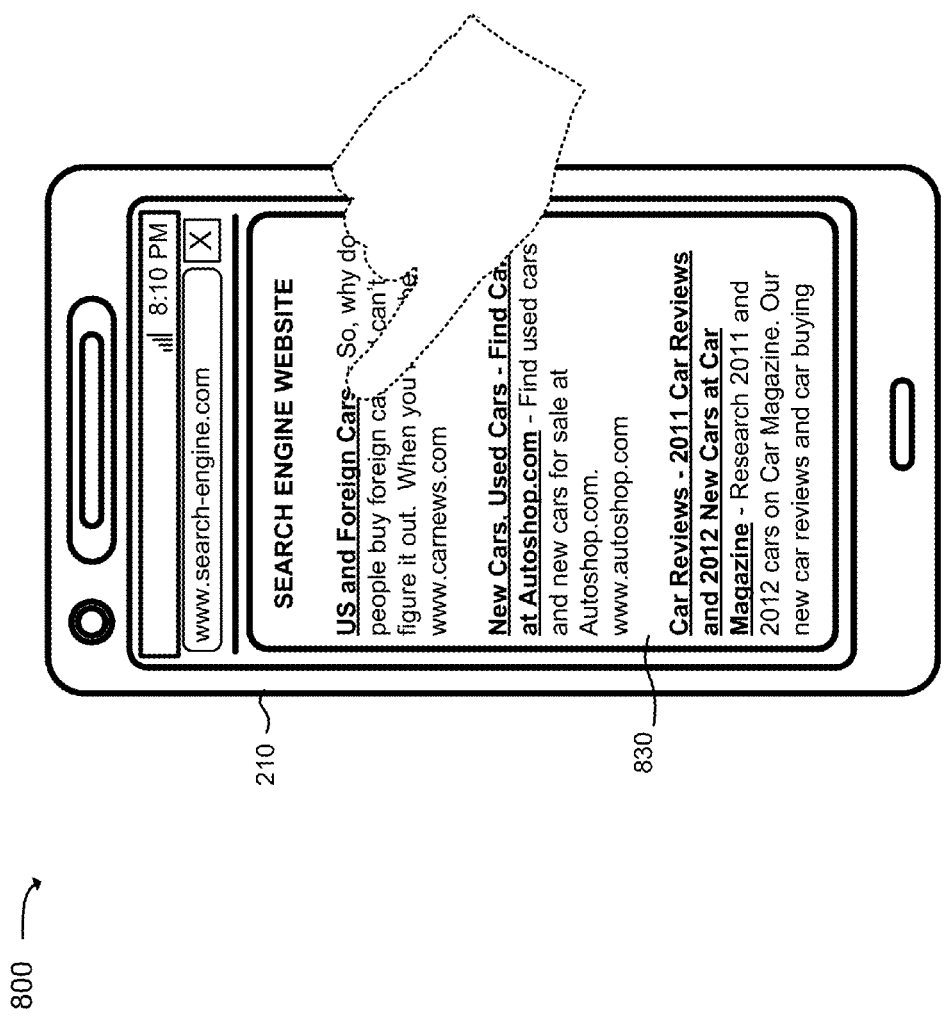

FIGS. 8A-8E are diagrams illustrating an example 800 of process 700. In example 800, assume a user was reviewing documents on the Internet and read a particular document that he/she found very interesting. Moreover, assume that a week later, the user wants to re-read the particular document, but has forgotten the identity of the particular document. The user does remember, however, that the text was related to cars, the particular document included an image of a dog, and that the particular document had a gray background. Thus, as illustrated in FIG. 8A, the user may use client 210 to access a search engine website. The user enter the following search query 810 into client 210:

car background:gray image:dog and cause the search query to be submitted to the search engine website by, for example, selecting the "SEARCH" button.

As illustrated in FIG. 8B, client 210 may submit search query 810 to searching component 430. Searching component 430 may receive search query 810 and compare the terms of the search query to keywords in index 630. For example 800, searching component 430 may compare the terms, or one or more variations of the terms, "car," "background:gray," and "image:dog" to keywords in index 630.

As illustrated in FIG. 8C, searching component 430 may identify search results 820, e.g., links to documents, based on the terms of search query 810 and using index 630. As described above, searching component 430 may determine scores for the search results and rank the search results based on the determined scores. Searching component 430 may generate a search results document 830, which includes a ranked list of search results 820, and send search results document 830 to client 210.

Figure 8E:
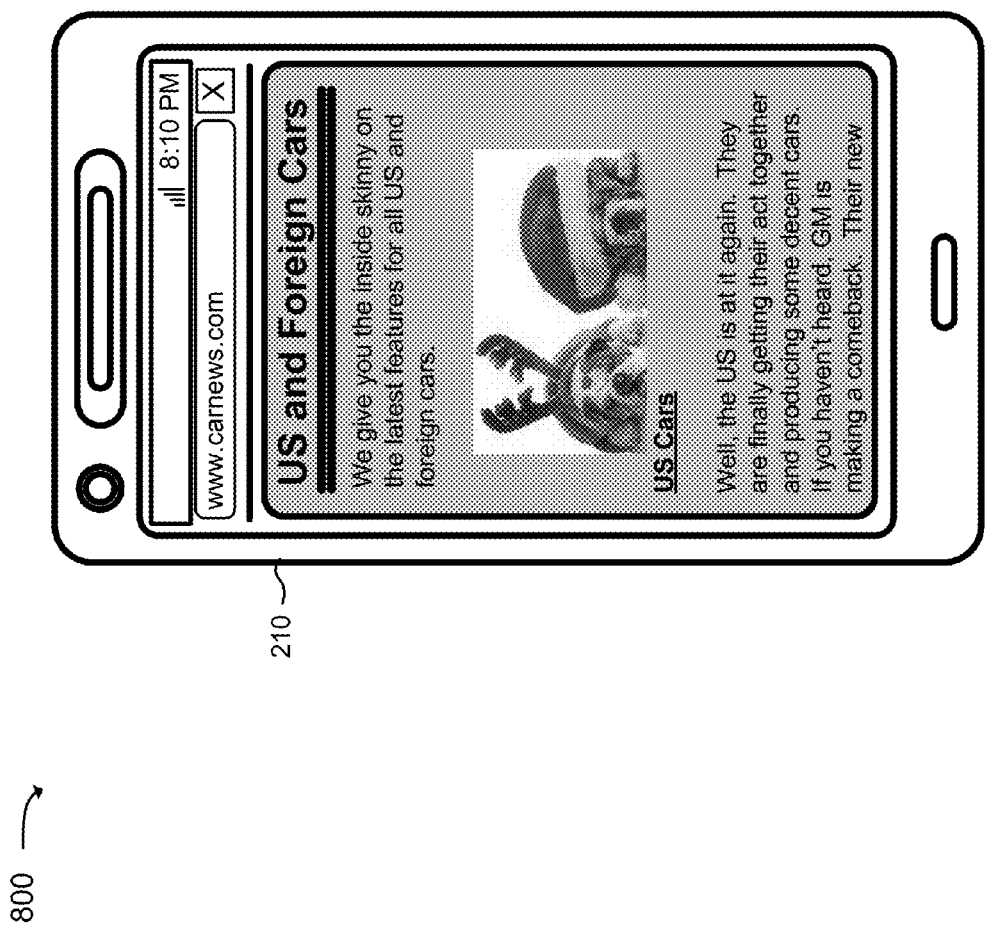

Client 210 may receive search results document 830 and cause all or a portion of search result document 830 to be displayed to the user, as shown in FIG. 8D. The user may then review the displayed documents. Assume that the document of interest is the highest ranking document in search results document 830. Upon selection of that document, client 210 may cause the document to be displayed, as shown in FIG. 8E. In this way, a user may search for documents based on the appearance of the documents.

The foregoing description provides illustration and description, but is not intended to be exhaustive or to limit the implementations to the precise form disclosed. Modifications and variations are possible in light of the above teachings or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by one or more computer devices, a search query from a client,
  the search query including a plurality of terms entered by a user of the client,
  the plurality of terms including:
    a first term related to a topic of a web page,
    a second term related to a first keyword of a plurality of keywords,
    a third term related to a second keyword of the plurality of keywords,
      the plurality of keywords corresponding to a plurality of visual features,
      the plurality of visual features including:
        a color of a background of the web page,
        a feature relating to an image in the web page, and
        at least one of:
        a color or a size of text in the web page, or
        a feature relating to a video in the web page,
      the first keyword relating to a first visual feature of the plurality of visual features,
      the second keyword relating to a second visual feature of the plurality of visual features,
      one of the first visual feature or the second visual feature including the color of the background of the web page, and
    a fourth term to be searched in relation to the one of the first visual feature or the second visual feature,
  an index associating the plurality of keywords with information identifying the web page;
converting, by the one or more computer devices, a format of the second term to a format of the first keyword in the index when the format of the second term does not match the format of the first keyword;
identifying, by the one or more computer devices, documents based on the search query and using the index, the identified documents including the web page; and
providing, by the one or more computer devices, a search results document to the client,
  the search results document identifying one or more of the identified documents.

2. The method of claim 1, further comprising:

generating the plurality of keywords based on the plurality of visual features,
  the plurality of visual features including:
    the color of the background of the web page,
    the feature relating to the image in the web page,
    the color or the size of the text in the web page, and
    the feature relating to the video in the web page;
associating, in the index, the plurality of keywords with the information identifying the web page, and
where the plurality of terms further includes:
  a fifth term to be searched in relation to another one of the first visual feature or the second visual feature.

3. The method of claim 1, further comprising:

generating the plurality of keywords based on the plurality of visual features, where generating the plurality of keywords comprises:
  generating a keyword based on the feature relating to the image in the web page, the feature relating to the image including information regarding an object in the image; and
associating, in the index, the keyword with the information identifying the web page,
where the plurality of terms further includes:
a fifth term identifying the keyword that is generated based on the feature relating to the image, and
a particular term to be searched in relation to the feature relating to the image,
the particular term identifying the object in the image.

4. The method of claim 3, where generating the keyword includes:
obtaining the image,
obtaining information based on analyzing the image, and
generating the keyword based on the obtained information.

5. The method of claim 1, further comprising:
generating a keyword based on an audible feature of the web page,
the audible feature corresponding to:
an indication of whether a sound is generated when the web page is rendered for display, or
an indication of whether music is generated when the web page is rendered for display,
a name of music that is generated when the web page is rendered for display, or
a name of an artist that is associated with music that is generated when the web page is rendered for display; and
associating, in the index, the keyword with the information identifying the web page,
where the plurality of terms further includes:
a term identifying the keyword that is generated based on the audible feature, and
a term to be searched in relation to the audible feature.

6. The method of claim 5, where generating the keyword further includes:
obtaining an audio file corresponding to the audible feature,
obtaining information based on analyzing the audio file, and
generating the keyword based on the obtained information,
where obtaining the information includes:
playing the audio file, and
obtaining the information based on playing the audio file.

7. The method of claim 1, further comprising:
generating at least one other keyword based on at least one of:
a length of the web page when the web page is rendered for display, or
a style of the web page when the web page is rendered for display; and
associating, in the index, the at least one other keyword with the information identifying the web page;
where the plurality of terms further includes:
a term related to the at least one other keyword, and
a term to be searched in relation to at least one of:
the length of the web page, or
the style of the web page.

8. The method of claim 1, further comprising:
generating the plurality of keywords based on the plurality of visual features,
where generating the plurality of keywords includes:
extracting information from hypertext markup language code associated with the web page, and
generating one or more of the plurality of keywords further based on the extracted information.

9. A system comprising:
one or more computer devices to:
receive a search query from a client,
the search query including a plurality of terms entered by a user of the client,
the plurality of terms including:
a first term related to a topic of a web page,
a second term related to a first keyword of a plurality of keywords,
a third term related to a second keyword of the plurality of keywords,
the plurality of keywords corresponding to a plurality of features of the web page,
the plurality of features including:
a color of a background of the web page,
a feature relating to an image in the web page, and
a feature relating to an audible feature of the web page,
the first keyword relating to a first feature of the plurality of features,
the second keyword relating to a second feature of the plurality of features, and
a fourth term to be searched in relation to one of the first feature or the second feature,
an index associating the plurality of keywords with information identifying the web page,
convert a format of the second term to a format of the first keyword in the index when the format of the second term does not match the format of the first keyword;
identify documents based on the search query and using the index,
the identified documents including the web page, and
provide a search results document to the client,
the search results document identifying one or more documents of the identified documents,
the one or more documents including the web page.

10. The system of claim 9, where the one or more computer devices are further to:
generate the plurality of keywords based on the plurality of features of the web page, and
where, when generating the plurality of keywords, the one or more computer devices are to:
generate the plurality of keywords for:
the color of the background of the web page,
the feature relating to the image in the web page, and
the feature relating to the audible feature of the web page,
a color or a size of text in the web page, and
a feature relating to a video in the web page, and
where the plurality of terms further includes:
a term identifying another one of the plurality of keywords that is generated based on another one of the plurality of features, and
a term to be searched in relation to the other one of the plurality of features.

11. The system of claim 9, where the one or more computer devices are further to:
generate a keyword based on the feature relating to the image in the web page,
the feature relating to the image including a quantity of images in the web page, and associate, in the index, the keyword with the information identifying the web page,
where the plurality of terms further includes:
a term identifying the keyword that is generated based on the feature relating to the image, and
a term to be searched in relation to the quantity of images in the web page.

12. The system of claim 11, where, when generating the keyword, the one or more computer devices are to:
obtain the image,
obtain information based on analyzing the image, and
generate the keyword based on the obtained information.

13. The system of claim 9, where the one or more computer devices are further to:
generate a keyword based on the audible feature of the web page, the audible feature corresponding to:
an indication of whether a sound is generated when the web page is rendered for display,
an indication of whether music is generated when the web page is rendered for display,
a name of music that is generated when the web page is rendered for display, or
a name of an artist that is associated with music that is generated when the web page is rendered for display; and
associate, in the index, the keyword with the information identifying the web page,
where the plurality of terms further includes:
a term identifying the keyword, and
a term to be searched in relation to the audible feature.

14. The system of claim 13, where, when generating the keyword, the one or more computer devices are further to:
obtain an audio file corresponding to the audible feature,
obtain information based on analyzing the audio file, and
generate the keyword based on the obtained information,
where, when obtaining the information, the one or more computer devices are to:
play the audio file, and
obtain the information based on playing the audio file.

15. The system of claim 9, where the one or more computer devices are further to:
generate at least one other keyword based on:
information identifying a length of the web page when the web page is rendered for display, and
information identifying a style of the web page when the web page is rendered for display; and
associate, in the index, the at least one other keyword with the information identifying the web page;
where the search query further includes:
a term related to the at least one other keyword, and
a term to be searched in relation to:
the length of the web page, and
the style of the web page.

16. The system of claim 9, where the one or more computer devices are further to:
generate the plurality of keywords based on the plurality of features of the web page, and
where, when generating the plurality of keywords, the one or more computer devices are to:
extract information from hypertext markup language code associated with the web page, and
generate one or more of the plurality of keywords based on the extracted information.

17. A non-transitory computer-readable medium for storing instructions, the instructions comprising:
one or more instructions, which when executed by one or more processors, cause the one or more processors to:
receive a search query from a client,
the search query including a plurality of terms entered by a user of the client,
the plurality of terms including:
a first term related to a topic of a document,
a second term related to one of a plurality keywords,
the one of the plurality of keywords being generated based on one of a plurality of features,
the plurality of features including:
a color of a background of the document,
a feature relating to an image in the document, and
a feature relating to an audible feature of the document, and
a third term to be searched in relation to the one of the plurality of features,
an index associating the plurality of keywords with information identifying the document,
convert a format of the second term to a format of the one of the plurality of keywords in the index when the format of the second term does not match the format of the one of the plurality of keywords,
identify documents based on the search query and using the index,
the identified documents including the document, and
provide a search results document to the client,
the search results document identifying one or more documents of the identified documents,
the one or more documents including the document.

18. The computer-readable medium of claim 17, where the instructions further comprise:
one or more instructions to generate a keyword based on the feature relating to the image in the document,
where the feature relating to the image includes at least one of:
an object in the image, or
a quantity of images in the document, and
one or more instructions to associate, in the index, the keyword with the information identifying the document,
where the one or more instructions to generate the keyword include:
one or more instructions to obtain the image,
one or more instructions to obtain information based on analyzing the image, and
one or more instructions to generate the keyword based on the obtained information, and
where the plurality of terms further includes:
a term identifying the keyword that is generated based on the feature relating to the image, and
a term to be searched in relation to:
the object in the image, or
the quantity of images in the document.

19. The computer-readable medium of claim 17, where the instructions further include:
one or more instructions to generate a keyword based on the audible feature of the document,
the audible feature corresponding to:
an indication of whether a sound is generated when the document is rendered for display,
an indication of whether music is generated when the document is rendered for display, a name of music that is generated when the document is rendered for display, or a name of an artist that is associated with music that is generated when the document is rendered for display; and one or more instructions to associate, in the index, the keyword with the information identifying the document, where the plurality of terms further includes:

a term identifying the keyword that is generated based on the audible feature, and a term to be searched in relation to:

the indication of whether a sound is generated when the document is rendered for display, the indication of whether music is generated when the document is rendered for display, the name of music that is generated when the document is rendered for display, or the name of an artist.

20. The computer-readable medium of claim 19, where the one or more instructions to generate the keyword include:

one or more instructions to obtain an audio file corresponding to the audible feature, one or more instructions to obtain information based on analyzing the audio file, and one or more instructions to generate the keyword based on the obtained information, where the one or more instructions to obtain the information based on analyzing the audio file include:

one or more instructions to play the audio file, and one or more instructions to obtain the information based on playing the audio file.

\* \* \* \* \*